US007000002B2

United States Patent
Suzuki et al.

(10) Patent No.: US 7,000,002 B2
(45) Date of Patent: *Feb. 14, 2006

(54) STREAMING DATA FROM MULTIPLE SOURCES ACCORDING TO STORAGE LOCATION INFORMATION

(75) Inventors: Naoya Suzuki, Kanagawa (JP); Hidekazu Tanaka, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/087,122

(22) Filed: Mar. 22, 2005

(65) Prior Publication Data

US 2005/0162936 A1    Jul. 28, 2005

Related U.S. Application Data

(63) Continuation of application No. 09/775,783, filed on Feb. 2, 2001.

(30) Foreign Application Priority Data

Feb. 4, 2000    (JP) .............................. 2000-032816

(51) Int. Cl.
*G06F 12/00* (2006.01)
*G06F 13/00* (2006.01)
*H04L 12/28* (2006.01)

(52) U.S. Cl. ...................... 709/217; 709/218; 709/219; 709/238; 370/338; 455/556.1; 455/556.2

(58) Field of Classification Search ................ 709/217, 709/218, 219, 238; 370/338; 455/556.1, 455/556.2

See application file for complete search history.

(56) References Cited

U.S. PATENT DOCUMENTS

| 5,721,783 A | 2/1998 | Anderson |
| 6,243,581 B1 | 6/2001 | Jawanda |
| 6,394,341 B1 | 5/2002 | Makipaa et al. |
| 6,603,977 B1 | 8/2003 | Walsh et al. |
| 2002/0065041 A1 | 5/2002 | Lunsford et al. |
| 2004/0081129 A1 | 4/2004 | Haller et al. |

*Primary Examiner*—Jack Lane
(74) *Attorney, Agent, or Firm*—Frommer Lawrence & Haug LLP; William S. Frommer (57) ABSTRACT

In a data processing system, device, and method and a program storage medium, provided are data storage devices that store data and a data processing device that receives a list describing information about data stored in the data storage devices from the data storage devices and that receives and processes data selected based on the received list. Accordingly, a large amount of data can be processed with the data processing device irrespective of storage capacity of storage means.

1 Claim, 6 Drawing Sheets

STREAMING DATA FROM MULTIPLE SOURCES ACCORDING TO STORAGE LOCATION INFORMATION

This is a continuation of application Ser. No. 09/775,783 filed Feb. 2, 2001, the entirety of which is incorporated herein by reference.

BACKGROUND OF THE INVENTION

1. Field of the Invention

The present invention relates to a data processing system, device, and method and a program storage medium, and more particularly, is suitably applied for the data processing system, device, and method, as well as the program storage medium for receiving and reproducing compression-coded music data, for example.

2. Description of Related Art

In recent years, voice compression coding techniques, such as MPEG1 Audio Layer3 (MP3), for encoding voice signals with high efficiency to compress the amount of data have been widely used. For a personal computer, for example, the use of these voice compression coding techniques enables storing music data as much as that equivalent to a dozen or so compact disks in a hard disk.

Also in recent years, there are portable digital audio apparatus for storing music data compressed with the voice compression coding techniques in storage means such as a semiconductor flash memory and for reproducing it from the storage means. Such portable digital audio apparatus do not require mechanical movable parts, so that they have advantages that their configurations can be downsized and that they are less susceptible to disturbances caused by vibration, compared to conventional portable audio apparatus like a Compact Disk (CD) player, for example.

However, the portable digital audio apparatus having such a configuration have a problem that limited storage capacity of the storage means does not allow to store a large amount of music data, thereby allowing only limited music numbers to be reproduced.

SUMMARY OF THE INVENTION

In view of the foregoing, an object of this invention is to provide a data processing system, device, and method, as well as a program storage medium, which are capable of reproducing music data containing many numbers irrespective of storage capacity of the storage means.

The foregoing object and other objects of the invention have been achieved by the provision of a data processing system comprising: a first data storage device for storing predetermined data via a wireless communication means; a data processing device for receiving a list of information about the data stored in the first data storage device from the first data storage device to display the list in a display section, and for receiving a portion of the data selected out of the list from the first data storage device using a wireless communication means that can communicate with the wireless communication means in the first data storage device and processing the portion of data.

Furthermore, according to the present invention, a data processing device comprises: wireless communication means for performing short-range wireless communication with a data storage device; a display section for displaying a list on data that is stored in the data storage device and received from the data storage device; storage means for receiving a portion of the data selected out of the list from the data storage device and storing the portion of the data; and data processing means for performing a predetermined process using the received data.

Still further, according to the present invention, a data processing method comprises the steps of: receiving a list on data stored in a first data storage device and data stored in a second data storage device connected onto a network via a wireless telephone network for storing predetermined data from the first data storage device using wireless communication means; displaying the received list; requesting a portion of data selected from the list from the first data storage device or the second data storage device using the wireless communication means or wireless telephone communication means; storing the received data; and performing a predetermined process using the received data.

Still further, according to the present invention, in a program storage medium for making a data processing device execute a program, the program comprising the steps of: receiving a list on data stored in a first data storage device and data stored in a second data storage device connected to a network via a wireless telephone network for storing predetermined data from the first data storage device using wireless communication means; displaying the received list; requesting a portion of data selected from the list from the first data storage device or the second data storage device using the wireless communication means or wireless telephone communication means; storing the received data; and performing a predetermined process using the received data.

It is possible to process much data irrespective of storage capacity of the storage means by selecting the data based on the list and by receiving the selected data from the sequential data storage devices to process the data in turn within the range of storage capacity of the storage means.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with-reference to the accompanying drawings:

(1) Entire Configuration of Information Processing System

Figure 1:
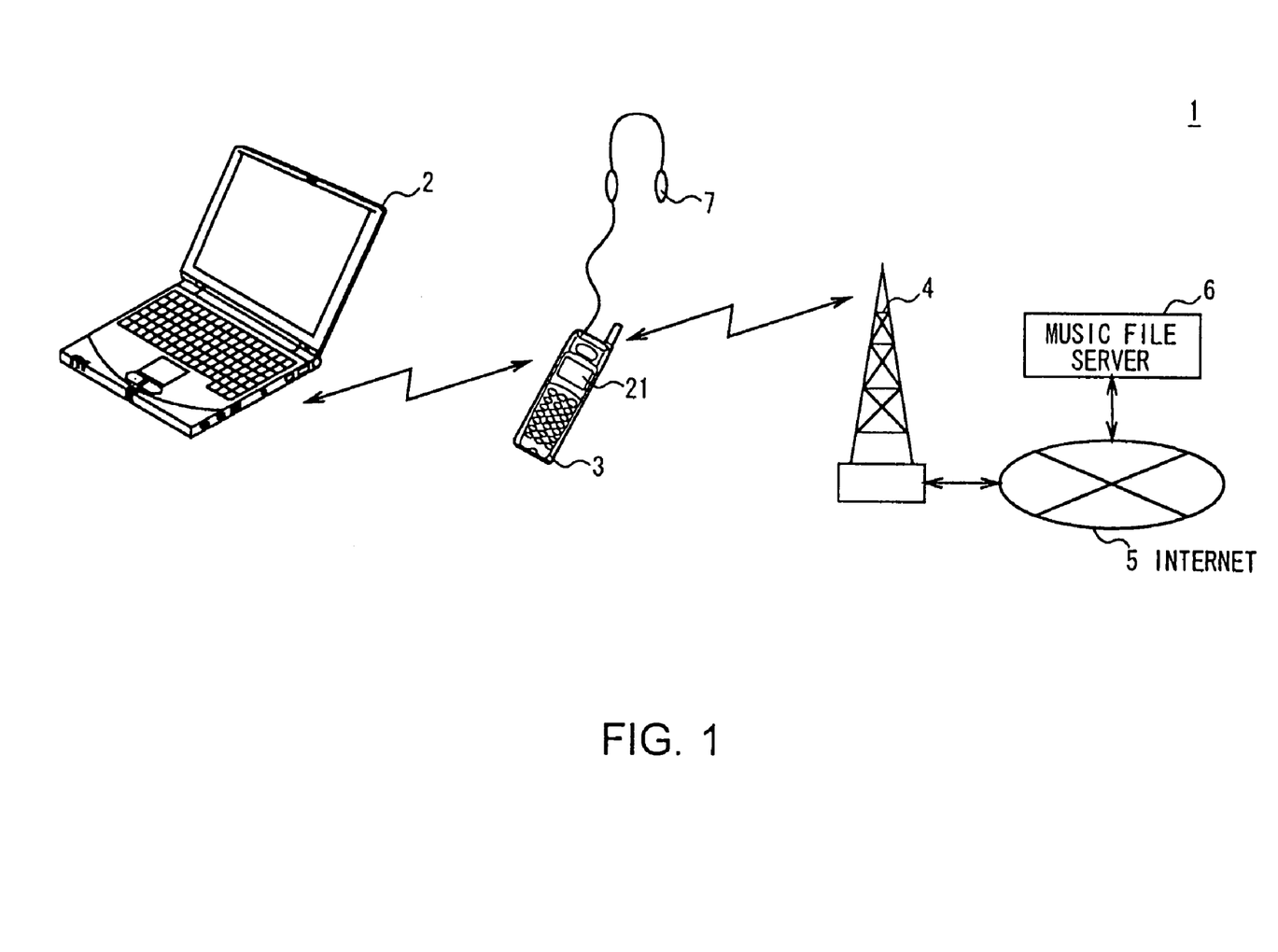
FIG. 1 is a schematic diagram of an entire configuration of an information processing system according to the present invention.

In FIG. 1, reference numeral 1 denotes an information processing system as a whole to which the present invention is applied. The system consists of a notebook personal computer (referred to as a notebook computer hereafter) 2, a digital portable phone 3, and a music file server 6 connected to the Internet 5.

The digital portable phone 3 as a data processing device is connected to a base station 4 via wireless connection and is adapted to be able to carry out various kinds of communication such as voice communication and data communication via the base station 4 with various communication terminals, such as portable phones and wired phones connected to public switched networks (not shown), or such as various servers, personal computers, and Personal Digital Assistants (PDAs) connected to the Internet 5.

The notebook computer 2 and the digital portable phone 3 are adapted to be able to communicate interactively with wireless communication conforming to Bluetooth (registered trademark), a wireless communication standard. Accordingly, the notebook computer 2 is adapted to be able to carry out various kinds of wireless communication via the digital portable phone 3 with various other communication terminals such as those connected to the public switched networks.

Here, Bluetooth is a standard for short-range wireless data communication that was standardized by a standardization organization, Bluetooth Special Interest Group (SIG). It sets 79 channels having a bandwidth of 1 MHz in the 2.4 GHz Industrial Scientific Medical (ISM) band and transmits data within a range of approximately 10 meters with a data transmission rate of 1 Mbit/s (effectively 721 kbit/s) using a frequency hopping spread spectrum communication technique that switches the channels 1600 times per second.

Each of the notebook computer 2 and the music file server 6 as data storage devices stores a plurality of music data files (referred to as music files hereafter) compressed with voice compression coding techniques, such as MPEG1 Audio Layer3 (MP3) and Adaptive TRansform Acoustic Coding (ATRAC) (registered trademark). The notebook computer 2 also stores a title list file indicating titles etc. of the music files stored in the notebook computer 2 and the music file server 6.

The digital portable phone 3 downloads the title list file from the notebook computer 2 in response to a user's operation and displays a title list in a display section 21 in accordance with the title list file. The digital portable phone 3 is adapted to then download the music files selected by the user out of the displayed title list from the notebook computer 2 or the music file server 6 and to reproduce the files, which is then outputted via a headphone 7.

(2) Notebook Computer Configuration

Figure 2:
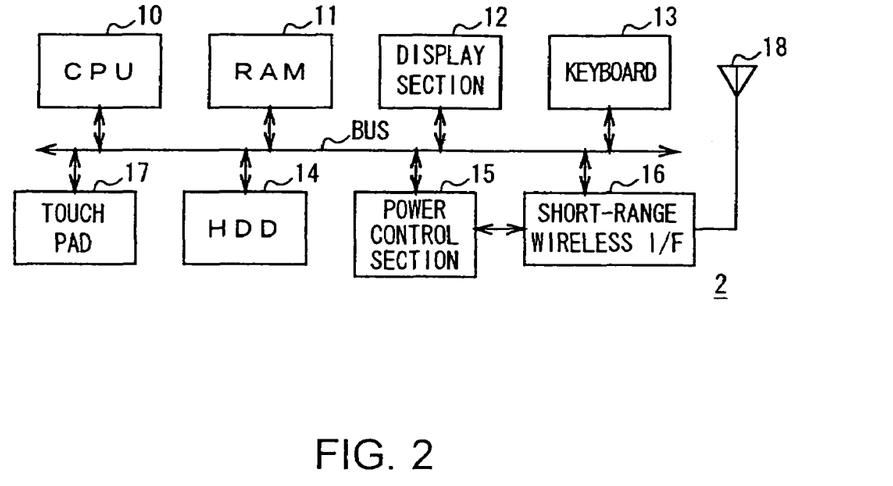
FIG. 2 is a block diagram showing circuitry of a notebook personal computer.

As shown in FIG. 2, the notebook computer 2 has a configuration in which a CPU 10, a Random Access Memory (RAM) 11, a display section 12 comprising a liquid crystal display, a keyboard 13, a hard disk drive (HDD) 14, a power control section 15, a short-range wireless interface 16 conforming to the Bluetooth standard, and a touch pad 17 are connected to a data bus, BUS.

Stored in the HDD 14 are an operating system program such as Windows98 (trademark of Microsoft Corporation) and application programs such as a music library management program, which will be described below.

The CPU 10 is adapted to appropriately read out the programs stored in the HDD 14 and to execute various kinds of process by deploying the programs on the RAM 11 and executing the programs. The CPU 10 controls each circuit section of the notebook computer 2 in accordance with the process and displays the processing results in the display section 12.

Figure 3:
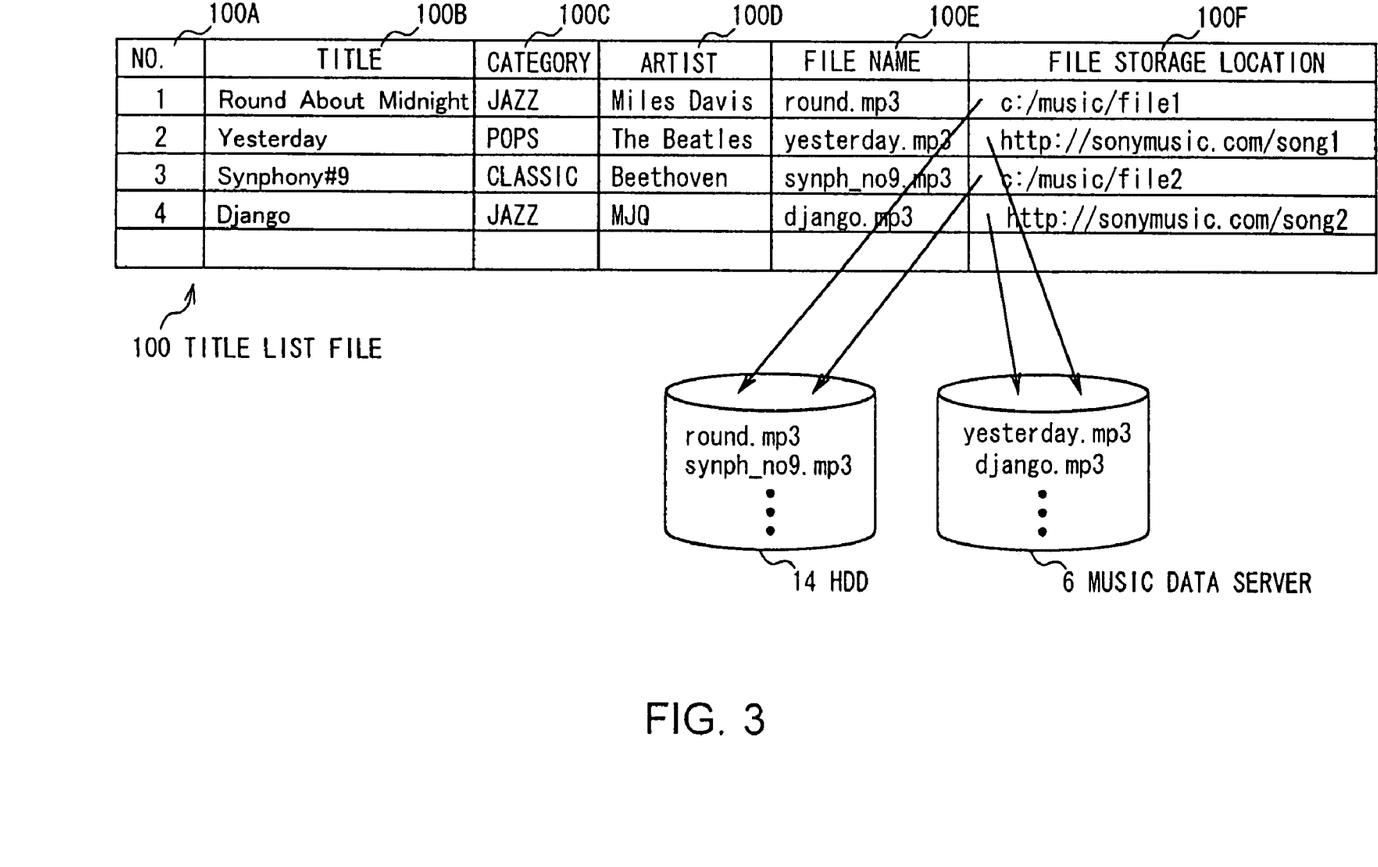
FIG. 3 is a schematic diagram showing a data configuration of a title list file.

Also stored in the HDD 14 are the music files and the title list file 100 shown in FIG. 3, which were downloaded from the music data server 6 (FIG. 1).

The title list file 100 consists of music No. information 100A, title information 100B, category name information 100C, artist name information 100D, file name information 100E, and file storage location information 100F.

Described in the file storage location information 100F are storage locations (HDD 14 of the notebook computer 2, or the music data server 6) of the music files indicated in the file name information 100E. For example, the file storage location information 100F for the music file "round.mp3" of No. 1 is "C:/music/file1", which represents that the music file is stored in the HDD 14 (C drive) of the notebook computer 2. The file storage location information 100F for the music file "yesterday.mp3" of No. 2 is "http://sonymusic.com/song1", which represents that the music file is stored in the music data server 6.

In this manner, the notebook computer 2 is adapted to be able to know whether the specified music file is stored in the HDD 14 or the music data server 6 by the file storage location information 100F in the title file list 100.

That is, the CPU 10 of the notebook computer 2 operates in accordance with the music library management program, with first downloading the title list file 100 from the music data server 6, then storing the title list file in the HDD 14 and displaying the title list in the display section 12 in accordance with the title list file.

Then, the CPU 10 downloads the music file specified by the user out of the displayed title list file 100 from the music data server 6, stores the music file in the HDD 14, and overwrites the file storage location information 100F of the title list file 100 in the HDD 14 for the downloaded music file with the location in the HDD 14 where the music file is stored.

The power control section 15 (FIG. 2) controls power supply for each circuit section of the notebook computer 2 and is adapted to keep the short-range wireless interface 15 active even when the notebook computer 2 is inactive by constant power supply.

The short-range wireless interface 16 is a short-range wireless communication device conforming to the Bluetooth standard (a Bluetooth interface) and carries out wireless data communication via an antenna 18 with the digital portable phone 3, which is a nearby Bluetooth-compatible apparatus.

The short-range wireless interface 16 is always active, including when the notebook computer 2 is inactive. It is adapted to activate the personal computer 2 when the notebook computer 2 is inactive by outputting an activation instruction for the power control section 15 to initiate power supply for each circuit section forming the personal computer 2 in response to the receipt of an activation signal from the digital portable phone 3.

Further, when the CPU 10 receives a transmission request for the music file or the title list file 100 from the digital portable phone 3 via the short-range wireless interface 16, the. CPU 10 responds by reading out the music file or the title list file 100 from the HDD 14 and by sending it to the digital portable phone 3 via the short-range wireless interface 16.

Figure 4:
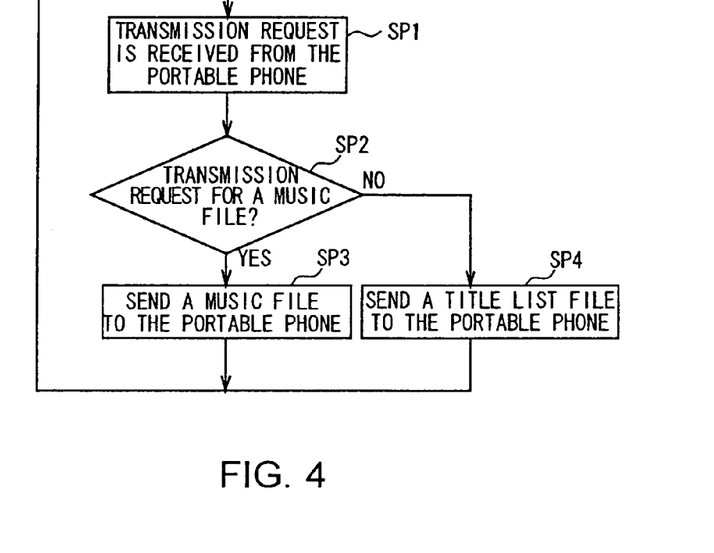
FIG. 4 is a flow chart showing a procedure for the notebook computer to send a file.

That is, the CPU 10 enters a starting step of a routine RT1 and proceeds to a step SP1 in accordance with the music library management program as shown in FIG. 4. At the step SP1, the CPU 10 receives the transmission request for the music file or the title list file from the digital portable phone 3, and then proceeds to the next step SP2.

At the step SP2, the CPU 10 determines whether or not the received transmission request is the transmission request for the music file.

If the result at the step SP2 is YES, it means that the received transmission request is the transmission request for the music file. The CPU 10 proceeds to the next step SP3, where it reads out the music file corresponding to the transmission request from the HDD 14 to send the file to the digital portable phone 3, and returns to the step SP1.

Conversely, if the result at the step SP3 is NO, it means that the received transmission request is the transmission request for the title list file rather than the music file. The CPU 10 then proceeds to the next step SP4, where it reads out the title list file from the HDD 14, to send the file to the digital portable phone 3, and returns to the step SP1.

(3) Digital Portable Phone Configuration

The configuration of the digital portable phone 3 will be now described with reference to FIG. 5.

Figure 5:
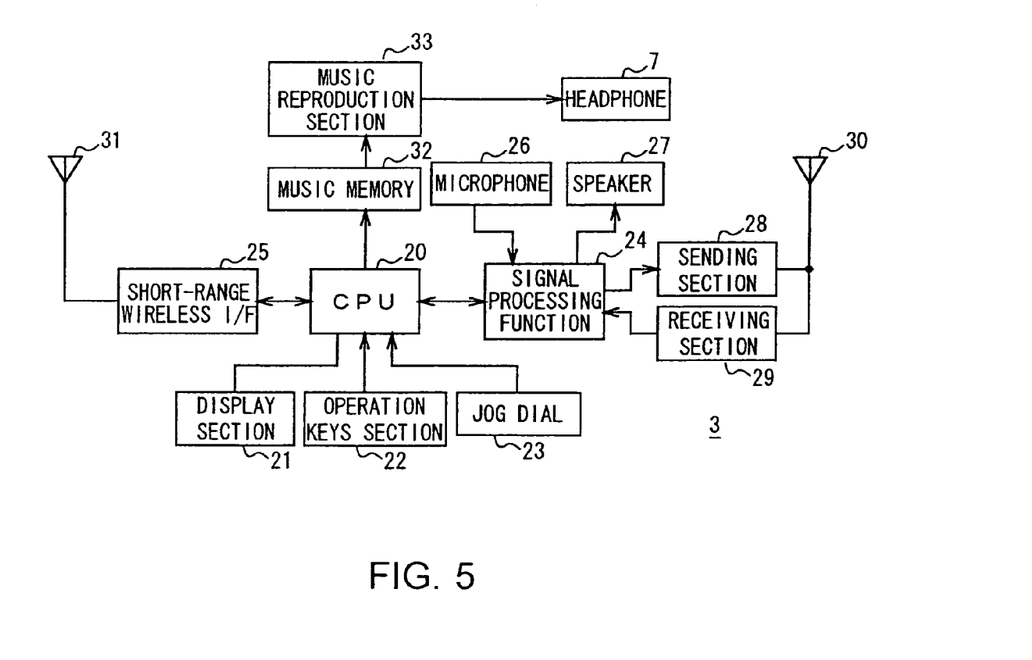
FIG. 5 is a block diagram showing circuitry of a digital portable phone.

As shown in FIG. 5, the digital portable phone 3 has a configuration in which a display section 21 comprising a liquid crystal display, an operation keys section 22, a jog dial 23, a signal processing section 24, a short-range wireless interface 25 conforming to the Bluetooth standard, and a music data memory 32 are connected to a CPU 20, which controls the operation of the digital portable phone 3 as a whole. Moreover, a microphone 26, a speaker 27, a sending section 28, and a receiving section 29 are connected to the signal processing section 24.

The CPU 20 reads out various programs from a Read Only Memory (ROM) that is not shown, and executes the programs. Then, in the display section 21 comprising the liquid crystal display panel, the CPU 20 displays various kinds of information (for example, inputted phone numbers, menu items, a transmission history, a phone directory, etc.) corresponding to direction information inputted via the operation keys section 22 or the jog dial 23. The CPU 20 also executes various kinds of process corresponding to direction information for an originating or terminating process etc. by controlling the signal processing section 24 in accordance with the direction information inputted via the operation keys 22.

In practice, the digital portable phone 3 is a Code Division Multiple Access (CDMA) cellular portable phone that uses a Direct Sequence (DS) technique compatible to the IS95 standard. When a call is in progress, the signal processing section 24 performs a Cyclic Redundancy Check (CRC) error correction process for voice signals inputted by the microphone 25, and then performs a convolutional coding process. Furthermore, it multiplies the signals by a Pseudo Noise (PN) code to apply frequency spreading to them, and then modulates them with Quadrature Phase Shift Keying (QPSK) to generate a symbol stream to be sent. This symbol stream is inputted to the sending section 28. The sending section 28 performs digital/analog conversion for the symbol stream to be sent to generate signals to be sent, and processes them with frequency conversion. Then, it amplifies the signals and sends them via the antenna 30.

On the other hand, the receiving section 29 amplifies the signals received via the antenna 30 and processes them with frequency conversion. Then, it generates a received symbol stream with analog/digital conversion, which is to be inputted to the signal processing section 24. The signal processing section 24 demodulates the received symbol stream with QPSK and then multiplies them by the PN code to despread them. Furthermore, it performs maximum likelihood sequence estimation with the convolutional code and then performs the CRC error detection process to generate voice signals, which are to be outputted via the speaker 27.

The signal processing section 24 sends control signals to the base station 4 (FIG. 1) via the sending section 28 and the antenna 30 under control of the CPU 20 to perform the originating process, and receives incoming signals via the antenna 30 and the receiving section 29 to inform the CPU 20 of the reception.

The CPU 20 controls the signal processing section 24 to carry out wireless data communication with other communication terminals connected to the public switched networks via the sending section 28, the receiving section 29, and the antenna 30.

The CPU 20 also controls the short-range wireless interface 25 to carry out wireless data communication via the antenna 31 with the notebook computer 2 (FIG. 1), which is a nearby Bluetooth-compatible apparatus.

The CPU 20 is also adapted to exchange communication data between the signal processing section 24 and the short-range wireless interface 25, so that it can carry out wireless data communication between the notebook computer 2 and the other communication terminals connected to the public switched networks, via the-digital portable phone 3.

Figure 6:
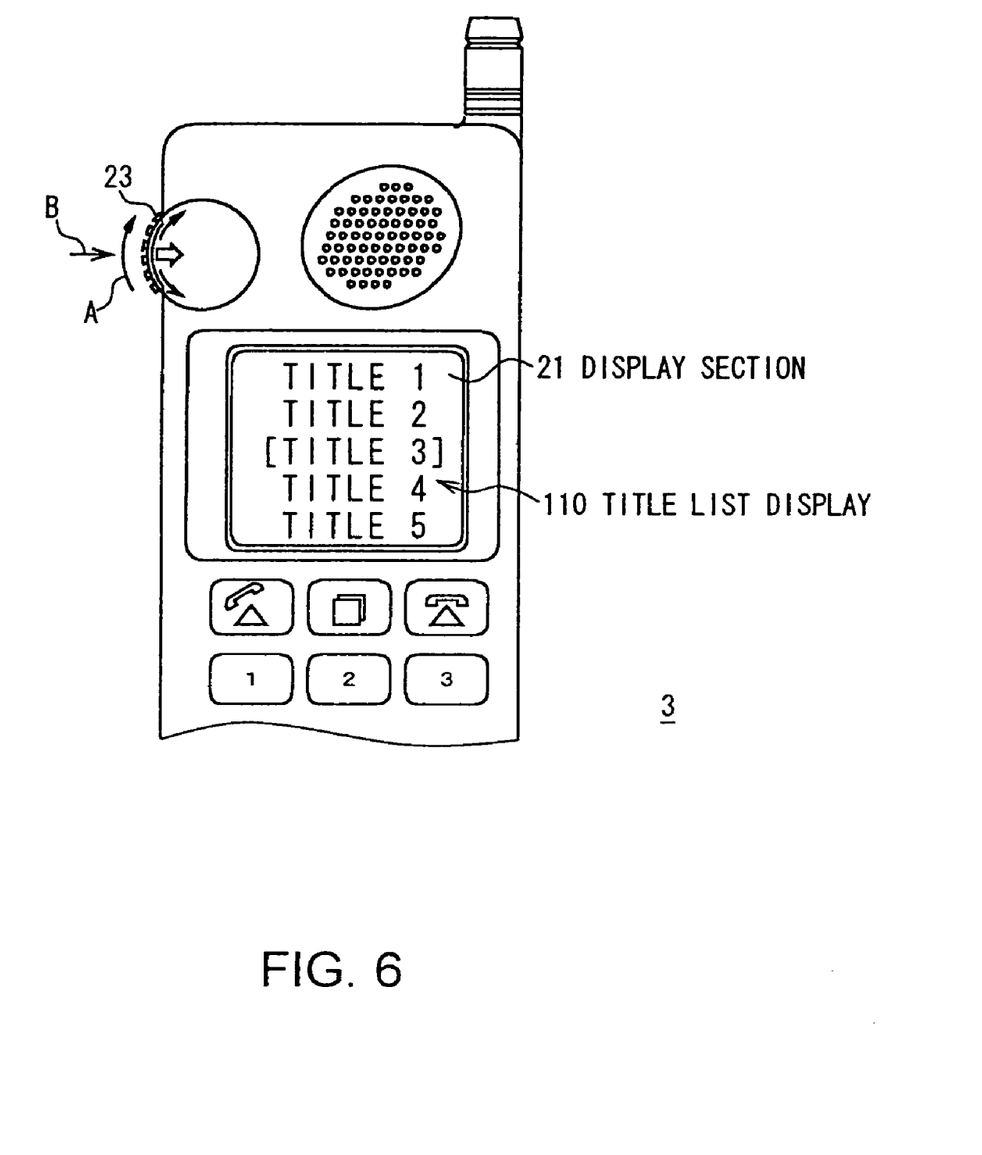
FIG. 6 is a schematic diagram showing a title list display.

The CPU 20 also responds to the user's operation by sending the transmission request for the title list file 100 to the notebook computer 2 via the short-range wireless interface 25 in accordance with the music reproduction program. Then, the CPU 20 receives the title list file 100 via the short-range wireless interface 25 and displays a title list display 110 as shown in FIG. 6 in the display section 21, based on the title list file 100. This title list display 110 displays the title information 100B for five music numbers out of the title list file 100 (FIG. 3).

When the jog dial 23 is wheeled to the direction of an arrow A or to the opposite direction, the CPU 20 responds by scrolling through the title list display 110 to sequentially display the title information 110B. Further, when the jog dial 23 is pressed to the direction of the arrow B, the CPU 20 determines that an item displayed in the middle of the title information 110B of the title list 110 is selected by the user and downloads the music file corresponding to the item from the notebook computer 2 or the music file server 6 to write it into the music data memory 32. Then the CPU 20 supplies the music file to a music reproduction section 33 with a predetermined timing, decodes it at the music reproduction section 33, and outputs it via the headphone 7.

Figure 7:
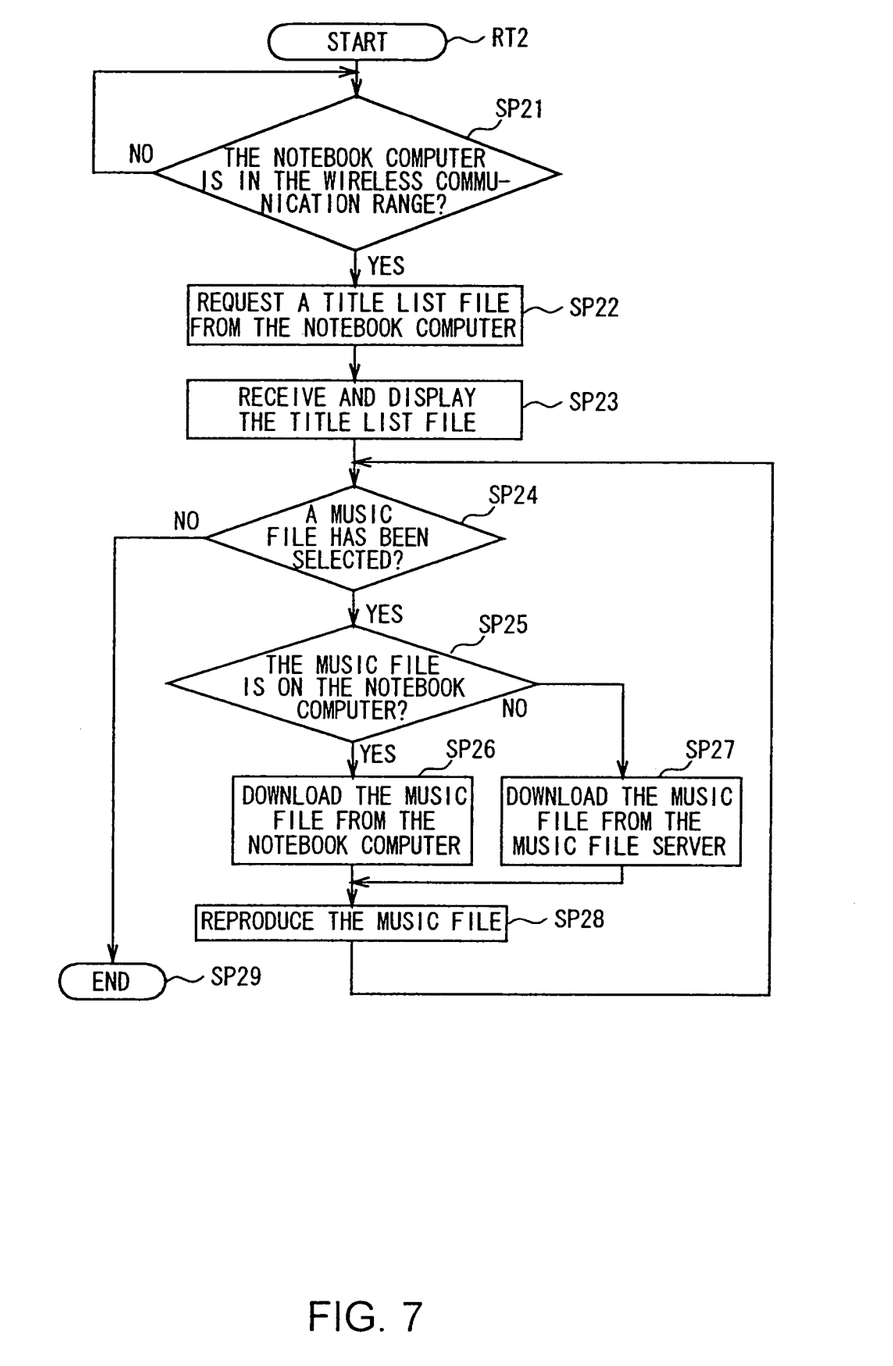
FIG. 7 is a flow chart showing a procedure for music file reproduction process.

That is, the CPU 20 of the digital portable phone 3 enters a starting step of a routine RT2 and proceeds to a step SP21, as shown in FIG. 7. At the step SP21, the CPU 20 queries the short-range wireless interface 25 to determine whether or not the notebook computer 2 is within the communication range of the short-range wireless interface 25.

If the result is NO at the step SP21, it means that the notebook computer 2 is not within the communication range of the short-range wireless interface 25. The CPU 20 then returns to the step SP21.

On the other hand, if the result is YES at the step SP21, it means that the notebook computer 2 is within the communication range of the short-range wireless interface 25. The CPU 20 then proceeds to the next step SP22.

At the step SP22, the CPU 20 sends the transmission request for the title list file 100 to the notebook computer 2 via the short-range wireless interface 25 in response to the user's operation, and proceeds to the next step SP23.

At the step SP23, the CPU 20 receives the title list file 100 from the notebook computer 2 via the short-range wireless interface 25, displays the title list display 110 in the display section 21 in accordance with the title list file 100, and proceeds to the next step SP24.

At the step SP24, the CPU 20 determines whether or not the user has pressed the jog dial 23 and selected the music file to be downloaded.

If the result is NO at the step SP24, it means that the user has not pressed the jog dial 23 and selected the music file to be downloaded. The CPU 20 proceeds to the step SP29 to terminate the process.

On the other hand, if the result is YES at the step SP24, it means that the user has pressed the jog dial 23 and selected the music file to be downloaded. The CPU 20 then proceeds to the next step SP25.

At the step SP25, the CPU 20 determines whether or not the selected music file is stored in the notebook computer 2, based on the file storage location information 100F (FIG. 3) for the selected music file.

If the result is YES at the step SP25, it means that the selected music file is stored in the notebook computer 2. The CPU 20 then proceeds to the next step SP2.6 to download the selected music file from the notebook computer 2 via the short-range wireless interface 25 and proceeds to the next step SP28.

On the other hand, if the result is NO at the step SP25, it means that the selected music file is stored in the music file server 6 rather than the notebook computer 2. The CPU 20 then proceeds to the next step SP27 to download the selected music file from the music file server 6 to the music data memory 32 via the Internet 5 and proceeds to the next step SP28.

At the step SP28, the CPU 20 reads out the downloaded music file from the music data memory 32, decodes the music file at the music reproduction part 33, and outputs the music file via the headphone 7.

(4) Operation and Effect of the Embodiment

In the above described configuration, the digital portable phone 3 downloads the title list file 100 for the music files stored in the notebook computer 2 and the file server 6 from the notebook computer 2 and displays the title list display 110 in the display section 21 in accordance with the title list file 100.

The digital portable phone 3 then downloads the music file selected by the user out of the title list display 110 from the notebook computer 2 or the music file server 6, based on the music file storage location information 100F in the title list file 100. Then, it decodes the music file at the music reproduction section 33 and reproduces the music files via the headphone 7.

Here, the digital portable phone 3 downloads the music files selected by the user out of the title list display 110 from the notebook computer 2 or the music file server 6 to reproduce the music files one by one as required. Accordingly, the digital portable phone 3 can reproduce the music data stored in the notebook computer 2 or the music file server 6 as if it were the music data in the digital portable phone 3. This enables the digital portable phone 3 to reproduce a large amount of music files irrespective of storage capacity of the music data memory 32 in the digital portable phone 3.

With the above described configuration, it is possible to select and reproduce the music files containing many numbers without being limited by storage capacity of the music data memory 32 in the digital portable phone 3. This is by virtue of that the short-range wireless interfaces 16 and 25 are provided in the notebook computer 2 and the digital portable phone 3 respectively, and that the desired music file is downloaded from the notebook computer 2 to the digital portable phone 3 via the short-range wireless interfaces 16 and 25 to reproduce the file, based on the title list display 120 displayed in the display section 21 of the digital portable phone 3.

Further, the user has no need to care about the storage location of the music files, and if a desired music file is not stored in the notebook computer 2, the user can download it from the music file server 6 to reproduce it. This is by virtue of that the information for the music files stored in the music file server 6 is recorded in the title list file 100 in addition to the information for the music files stored in the notebook computer 2 to enable the music files to be downloaded from either the notebook computer 2 or the music file server 6 to the digital portable phone 3.

(5) Other Embodiments

Although Bluetooth is used as the communication means between the digital portable phone 3 and the notebook computer 2 in the above described embodiment, the present invention is not limited to this form. For example, the digital portable phone 3 and the notebook computer 2 can be connected via various communication means, such as a short-range wireless communication like Home Radio Frequency (HomeRF) defined by Institute of Electrical and Electronics Engineers (IEEE) 802.11, or such as a infrared communication conforming to the Infrared Data Association (IrDA) standards.

Further, although the music data is intended to be downloaded and reproduced with the digital portable phone 3 in the above described embodiment, the present invention is not limited to this form. For example, the music data can be downloaded and reproduced with a dedicated device for music reproduction that does not have functional portions as a portable phone but only has a short-range wireless interface, music data memory, a music reproduction section, a display section, and an operation keys section.

Further, although the downloaded music files are intended to be once stored in the music data memory 32 and then read out from the music data memory 32 to be reproduced in the above described embodiment, the present invention is not limited to this form. For example, a so-called streaming reproduction can be performed for reproducing the music files while downloading them.

Further, although the music files are intended to be specified and downloaded one by one in the above described embodiment, the present invention is not limited to this form. For example, it is possible to specify a plurality of music files at a time to download and reproduce the specified plurality of music files in turn depending on storage capacity of the music data memory 32.

Further, although the digital portable phone 3 is intended to download and reproduce the music data in the above described embodiment, the present invention is not limited to this form. For example, the digital portable phone 3 can download and process various data, such as still picture data, animation data, or programs.

Yet further, although the digital portable phone 3 is intended to be a CDMA cellular portable phone in the above described embodiment, the present invention is not limited to this form. The digital portable phone 3 can use Wideband-CDMA (W-CDMA) or Time division Multiple Access (TDMA), or it can use International Mobile Telecommunication System (IMT)-2000, which is a next generation portable phone system.

Further, although the CPU 20 of the digital portable phone 3 is intended to download and reproduce the music data according to the previously stored music reproduction program in the ROM, the present invention is not limited to this form. The music reproduction program can be stored in various program storage media, and the music data can be downloaded and reproduced by installing the music reproduction program to the digital portable phone 3 with the program storage media.

As such, the program storage medium for installing the above described music reproduction program to the digital portable phone 3 to make it operable by the digital portable phone 3 can be provided as a packaged medium such as a floppy disk or a Digital Versatile Disk—Read Only Memory (DVD-ROM), as well as a semiconductor memory or a magnetic disc etc. in which the program is temporarily or permanently stored. Further, a wired or wireless communication medium, such as a local area network, the Internet, or digital satellite broadcasting, can be used as means for storing the music reproduction program in these program storage media, and the music reproduction program can be stored via various interfaces such as a router and a modem.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A data processing method comprising the steps of:

receiving a list, which includes at least titles of data and storage location information of said data, from a first data storage using wireless communication means, said titles of data including at least title information of a selection in said list, category information of said selection and artist information of said selection;

displaying said received list;

selecting a title of data from said titles of data;

downloading said data of said title from said first data storage device using said wireless communication means or from said second data storage device using wireless telephone communication means according to said storage location information corresponding to said title;

storing said downloaded data; and performing a predetermined process using said downloaded data.

* * * * *